Feb. 6, 1968  R. W. HARRUFF  3,367,296
DRIVING AND STOPPING MECHANISMS
Filed Oct. 12, 1964  5 Sheets-Sheet 1

Inventor
Ray W. Harruff
By his Attorney
Edward W Fearing

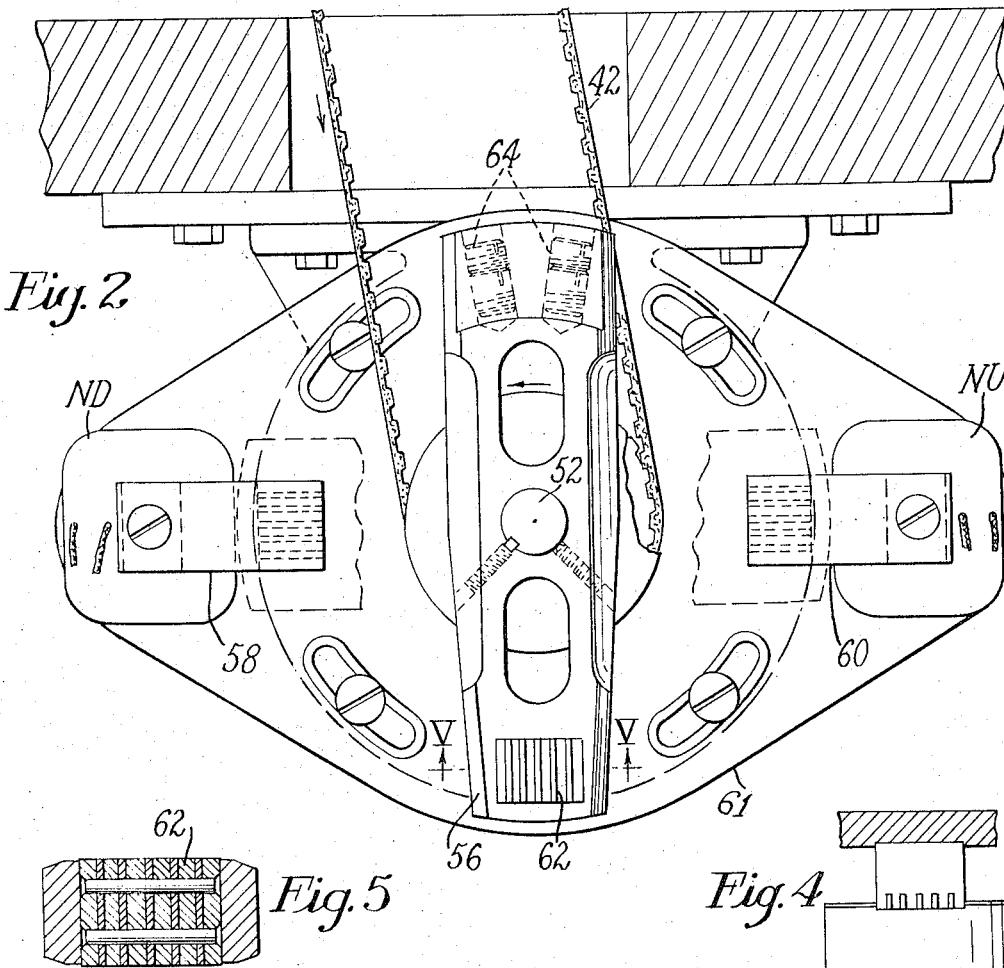
Fig. 2
Fig. 5
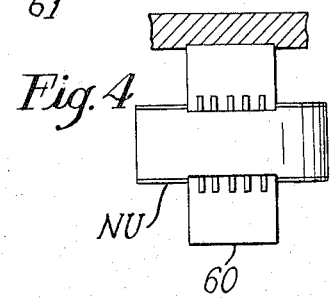
Fig. 4
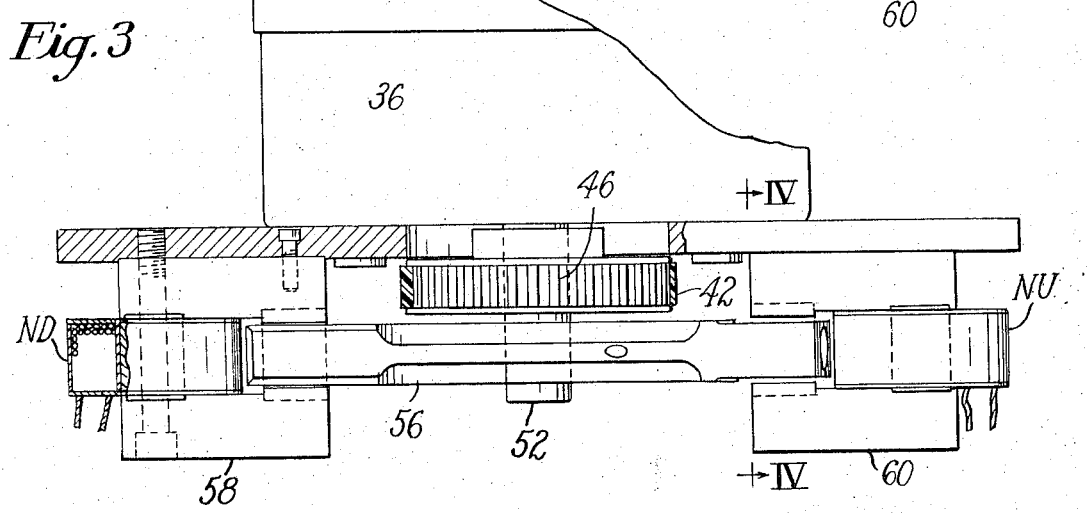
Fig. 3

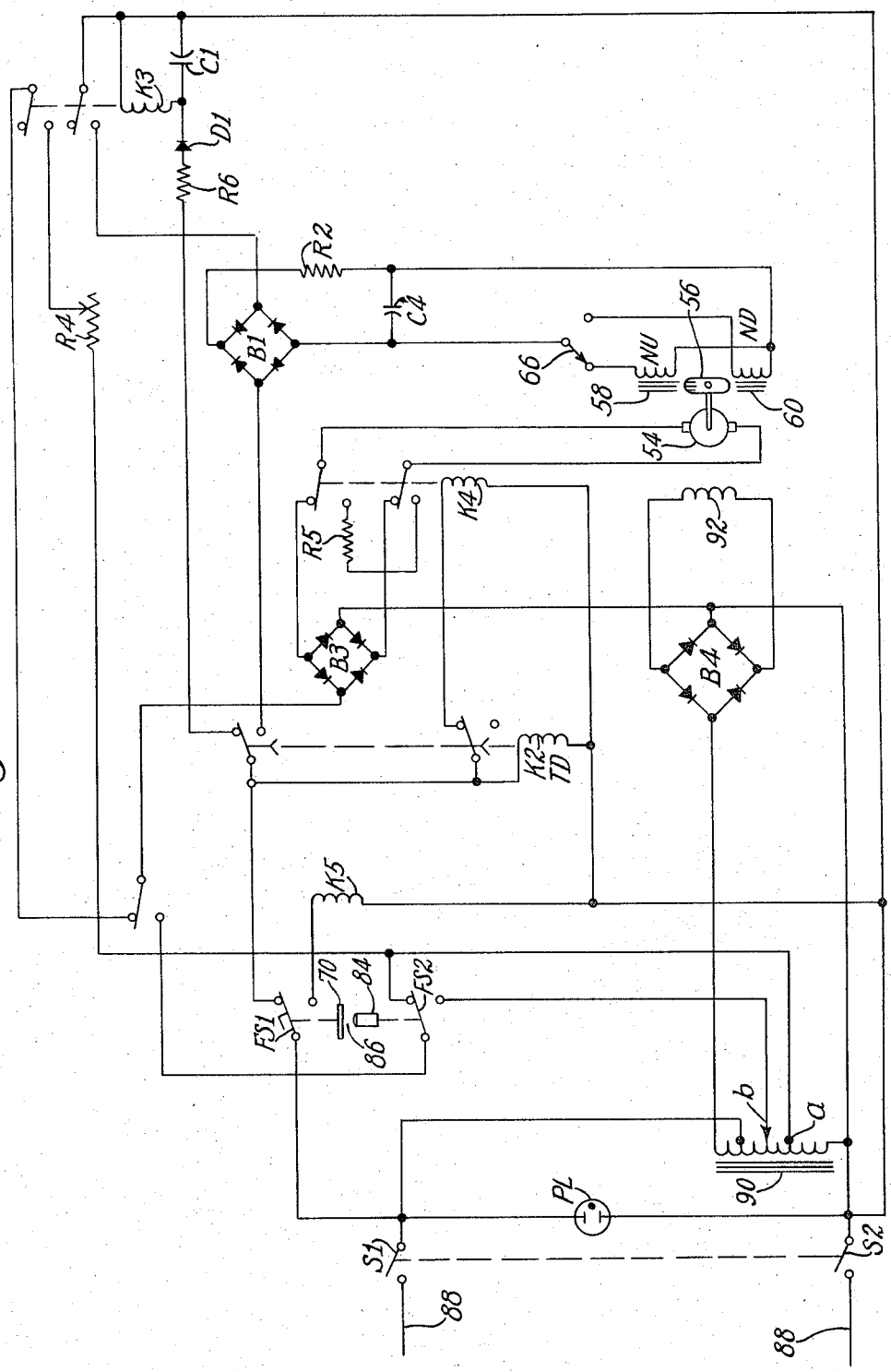

Fig. 10

| | Condition | Relay Energized | Power Applied To | Power Removed From | Result | Further Results |
|---|---|---|---|---|---|---|
| ① | S1, S2 On Treadle Up | K2 | Transformer | | B4 Energizes Motor Field Supply | Relays K3 and K4 Disconnected From Power Line |
| ② | Operator Presses Treadle Part Way and Operates FS-1 Only | K5 | B3 From (a) of Transformer | K2 | Motor Starts At Low Speed | Relays K3 and K4 Remain Disconnected From Line |
| ③ | Treadle Fully Depressed FS-2 Down | | High AC Voltage From (b) On Transformer To B3 | Low AC Is Removed From B3 | High Voltage Applied To Motor | Full Motor Speed |
| ④ | Operator Partly Releases Treadle FS-2 Up | | B3 From (a) For Low Voltage | High AC Voltage From B3 | Motor Slows | Low Motor Speed |
| ⑤ | Treadle Fully Released FS-1 Up | K4 | K2 But Pull-Down Delayed | K5 and Motor Armature | Motor Armature Connected Across Brake Resistor R5 | Motor Slows Further |
| ⑥ | Pull-Down Of K2 Delayed | K3 | B3 Through R4 And Normally Open Contacts Of K3 | | Voltage Of B3 Reduced By R4 | Motor Slows Still Further and May Stop |
| ⑦ | K2 Delay Expires Relay Pulls Down | | B1 | D1 | Power Removed From K3 But It Remains Energized By C1 | Stopping Solenoid NU or/ND Energized |
| ⑧ | K2 Remains Down | | NU or ND | K4 | Disconnects Armature From R5 Reconnects It To B3 | Motor Restarts At Speed Reduced By R4 |
| ⑨ | K3 Remains Energized By C1 | | NU or ND | | Machine Stops With Needle Up or Down Depending On Position of Switch 66 | Motor Stops |
| ⑩ | C1 Discharges | | | K3 | Stopping Solenoid De-Energized | End Of Cycle |

# United States Patent Office 3,367,296
Patented Feb. 6, 1968

3,367,296
DRIVING AND STOPPING MECHANISMS
Ray W. Harruff, Xenia, Ohio, assignor to United Shoe Machinery Corporation, Flemington, N.J., a corporation of New Jersey
Filed Oct. 12, 1964, Ser. No. 403,077
7 Claims. (Cl. 112—219)

ABSTRACT OF THE DISCLOSURE

A driving and stopping mechanism for driving a machine such as a sewing machine and stopping the machine in either of two positions such as with the needle in the work in the lowermost position or completely out of the work in the uppermost position including a motor, a dynamic braking circuit for the driving motor, a magnetic device for bringing the sewing shaft to rest in either predetermined position and a control circuit for assuring the actuation of the magnetic device only after the speed of the shaft has been reduced for a predetermined period of time by the braking circuit.

---

This invention relates to improvements in driving and stopping mechanisms for machines having tools for performing an operation by movement toward and from a work piece, wherein it is desirable to bring the machine to rest quickly with the operating tool either engaged or disengaged from the work. More particularly driving and stopping mechanisms of the type referred to are applicable to an automatic sewing machine, such as those disclosed in United States Letters Patent No. 3,080,836, granted Mar. 12, 1963 upon application of J. E. Clemens et al.

In the sewing machine of the Clemens et al. patent a work piece is intended to be introduced in the machine manually and the machine started in operation, whereupon the work piece will be guided automatically until the operation is completed. The work piece is then ejected and the machine brought to rest with the operating tool at a critical position where it does not interfere with the insertion of a new work piece and where it is ready to initiate a new operation. In some instances also it is desirable to bring the machine to rest with the operating tool engaging a work piece in order that adjustments may be made without disturbing the operating relationship between the tool and the work piece, this second stopping position preferably being capable of selection alternatively with the first position by a simple manipulation of the operator even while the machine is running if necessary.

In the machine of the prior patent the work piece after being manually presented to the machine is guided and turned by the action of light-responsive cells and electronically controlled steering devices. However, the machine is brought to rest first by reversing rotation of a driving motor and then by engagement of a cam projection on a main shaft of the machine with a mechanical striker arranged to absorb the kinetic energy of the machine in bringing it to rest with the operating tool at the desired position. Under these circumstances the effectiveness of the stopping mechanism is dependent upon mechanical friction between the cam projection and the striker, which engagement may result in irregularities in stopping position on account of variations in frictional coefficients and wear in the machine. Furthermore, the frictional effects produced are also dependent in some degree upon the inertia of the parts, so that a considerable amount of delay may occur between the times at which the stopping action is initiated and that at which the machine is brought to rest.

An important object of the present invention is to provide driving and stopping mechanisms for a machine of the type referred to, which is not dependent upon mechanical friction between operating parts and is not subject to uncertainties, such as time delay and inertia or frictional forces between such parts.

Other objects relate to improvements in driving and stopping mechanisms which when applied to a relatively high speed sewing or similar type machine is more reliable in operation, less expensive to manufacture and more versatile in adjustability and use than prior driving and stopping mechanisms.

To the accomplishment of these and other objects the driving and stopping mechanisms of the invention are illustrated as being embodied in a machine having a main tool actuating shaft, an electric motor connected to the shaft, a dynamic braking circuit for the motor to retard rotation of the shaft and an electrically energized magnetic stopping device acting at a predetermined angular position of the shaft to bring it to rest, in which control circuits are connected to the dynamic braking circuit and the magnetic device for energizing them in sequence, so that energization of the magnetic device is prevented while the sewing shaft is operating at regular speed before a period of retardation is produced by the dynamic braking circuit, thus avoiding erratic pulsations in the rotation of the shaft, undesirable shocks to the connections between the shaft and the operating tool. In this way it is no longer necessary to drive the shaft through a complete reversal, the shaft with the present stopping mechanism merely being brought to rest within a fixed period of retardation during its rotation in the same direction.

Preferably, the motor is connected to a high voltage for maximum speed and a reduced voltage source of power for insuring rotation of the tool actuating shaft in case its rotation has been stopped completely by the dynamic braking circuit before the magnetic stopping device becomes effective.

These and other features of the invention, as hereinafter described and claimed, together with the advantages obtained will readily be apparent to those skilled in the art from the following detailed description of the accompanying drawings, in which:

FIG. 2 is an enlarged detail view in right side elevation of a magnetic stopping device employed in the machine of FIG. 1;

FIG. 3 is a sectional plan detail view of the magnetic stopping device;

FIG. 4 is a sectional plan detail view taken along line IV—IV of FIG. 3 of a solenoid employed in the stopping device;

FIG. 5 is an enlarged sectional detail view taken along the line V—V of FIG. 2, showing an armature block arranged to cooperate with one of two solenoids employed in the stopping device;

FIG. 9 is an electrical circuit diagram for the driving and stopping mechanism; and FIG. 10 is a sequence chart indicating the operation of the driving and stopping mechanisms.

Figure 1:
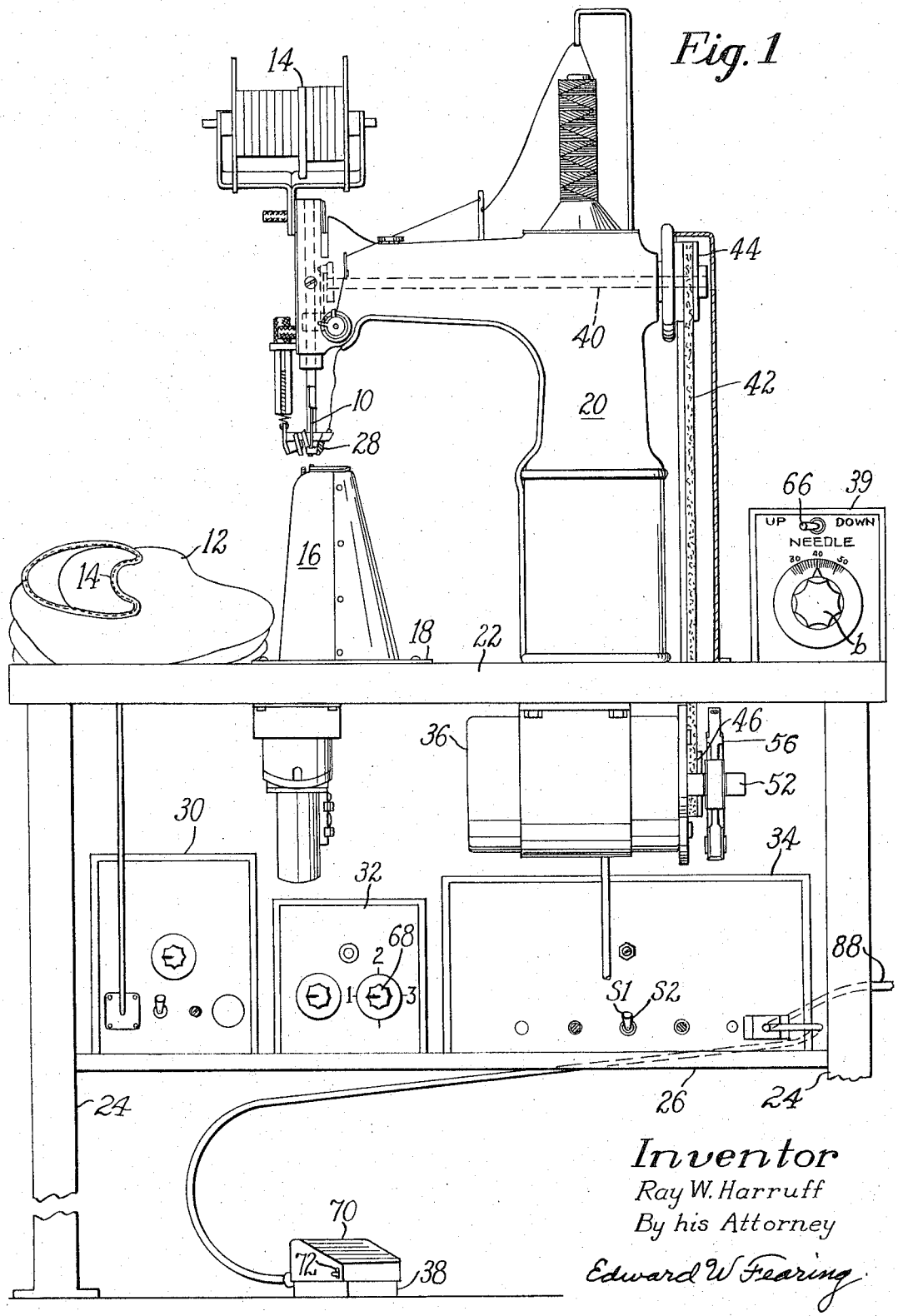
FIG. 1 is a view in front elevation, partly broken away at its base of a shoe upper sewing machine, embodying the features of the present invention.

The machine, to which the invention is herein shown as being applied, is a high speed lockstitch sewing machine, the operating tool for which consists of a straight eye-pointed needle 10 mounted for vertical reciprocation toward and from a work piece, such as a shoe upper 12 (FIG. 1) for the purpose of inserting a seam, the stitches of which pass through the overlapping edges of the work piece and a binding strip 14 folded over the edge of the upper. As in the machine of the prior patent above-identified, the present machine has a work supporting post 16 extending upwardly from a bed plate 18. The bed plate also has secured to it an overhanging arm 20 comprising the frame of the machine, in which the needle 10 is mounted for reciprocation. The machine is secured to the upper surface of a bench 22 mounted on legs 24, also carrying a shelf 26 for work guidance and control components, utilized by the machine. Included in the work guidance components are a number of light sensitive cells (not shown) located at the top of the work supporting post 16, a light fixture 28 on the arm 20, a preamplifier 30 on the shelf, a functional control box 32 and a control unit 34 electrically connected to a direct current driving motor 36, and to switches in a control treadle receptacle 38. The motor 36 is coupled for direct driving action on a main sewing shaft 40 to actuate the needle and other stitch forming devices in the machine by a cleat belt 42 engaging ribbed pulleys 44 and 46 on the sewing shaft 40 and a motor shaft 52, respectively. By the use of a cleat belt the sewing shaft 40 is driven at the same speed and in the same timed relationship to the rotation of the motor shaft, so that the sewing shaft may be brought to rest in a predetermined fixed angular position merely by stopping the motor shaft in a corresponding position.

The maximum speed at which the illustrated machine operates is approximately 2,000 r.p.m. so that it is necessary to apply a preliminary braking force for a fixed period of time to the main shaft, thus producing effective retardation before the stopping position is reached. For this purpose a dynamic braking circuit is provided for the motor to reduce the speed of the shaft to a sufficiently low rate to bring it accurately to its stopping position without excessive shock or other undesirable reaction. For this purpose the driving motor 36 has connected to its armature 54 a double pole, double throw relay containing an actuating coil K4 (FIG. 9), the contacts of the relay being arranged to connect a 3 ohm resistor R5 across the brushes of the motor armature whenever the coil K4 is energized. After the speed of the motor shaft 52 has been reduced to less than 200 r.p.m. there is energized a magnetic stopping device in the form of an aluminum bar 56 secured at its midportion to the free end of the motor shaft 52 with its free ends passing through gaps in two stationary magnetic cores 58, 60 (see also FIGS. 2 and 5 incl.). The cores 58 and 60 are secured to a plate 61 adjustably mounted on the underside of the bench 22 and are capable of being energized alternatively depending upon the wishes of the operator to bring the motor to a stopped position either with the needle disengaged from the work or engaged in its lowermost position after penetrating the work. In this latter position the work may be rotated about the needle 90° or more while the machine is at rest to form a sharp corner in a seam or in sewing a straight seam when it is desired to stop the machine without interrupting the continuity of the thread.

The magnetic cores 58 and 60 provide gaps through which the ends of the bar 56 move. One end of the bar is formed with a perforation, in which is inserted a laminated iron block 62 (FIG. 5) rotating with the bar 56 while the other end of the bar is drilled with a pair of radial bores into which are inserted two pairs of non-magnetic counterweight screws 64 (FIG. 2) to balance the mass of the magnetic block 62. When one of the cores is energized the magnetic block 62 is strongly attracted to remain in the gap of that core, so that while the motor shaft is rotating at low speed the kinetic energy of the motor, the bar 56 and the machine as a whole are entirely absorbed by the force of attraction provided by the magnetic block while moving through the gap in a core. For the purpose of balancing the magnetic block the counterbalance screws 64 may be moved into and out of their bores and locked in positions by tightening them one against another when the proper balance is reached.

To energize one or the other of the magnetic cores 58 or 60 they are surrounded by coils NU and ND which are connectable individually to a source of power through a manually actuated stop selector switch 66 (FIG. 9).

For connecting the dynamic braking circuit to the motor 36 and for energizing one of the coils ND or NU in proper sequence to avoid impact or shock as the magnetic block enters the field of a magnetic core, control circuits are provided which operate automatically in timed relation to each other whenever the machine is to be brought to rest. In this way the speed of the motor shaft is first reduced to a point where the attraction of the iron core on the magnetic block 62 will be adequate to bring the machine to rest without possibility of overthrow.

To insure that there will be no possibility of bringing the machine to rest with the magnetic block out of the range of attraction from the gap in one of the magnetic cores, a source of voltage, reduced substantially lower than that applied to the motor during normal maximum speed operations, is connected to the armature 54 just before the magnetic stopping device is energized. This is accomplished by utilizing another source of power and the sequence of the connections effected by the control circuit is determined by differently timed delay relays.

Figure 6:
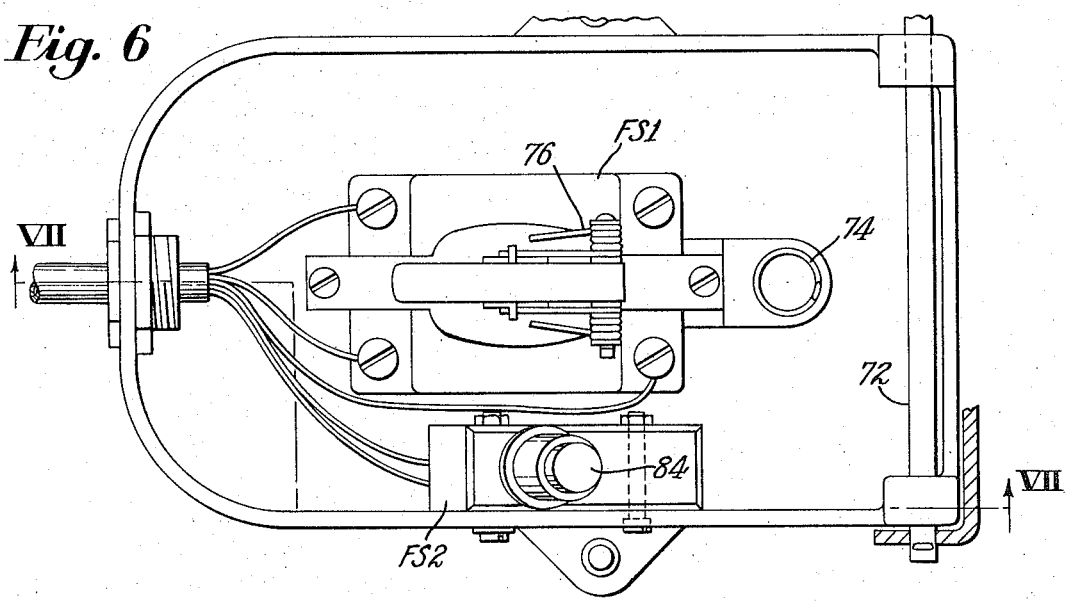
FIG. 6 is an enlarged sectional plan view of treadle control switches for the driving and stopping mechanism of the machine.
Figure 7:
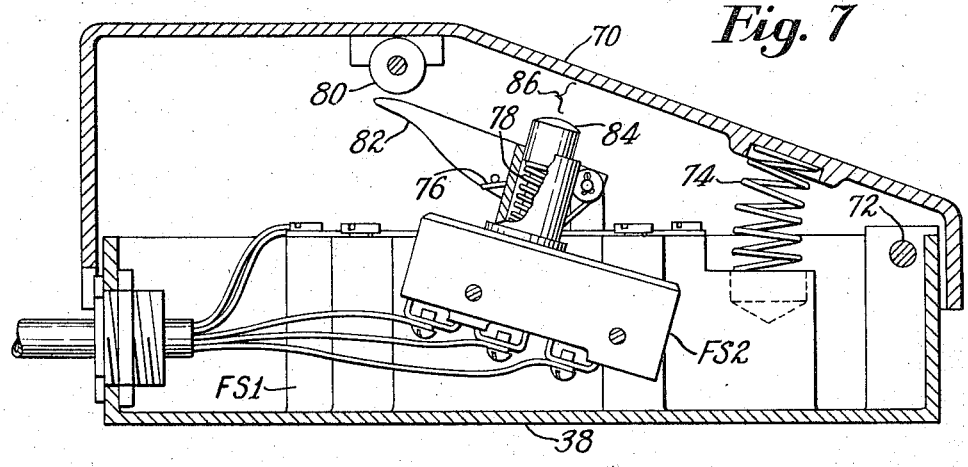
FIG. 7 is a sectional side view of the treadle control switches taken along the line VII—VII of FIG. 6.
Figure 8:
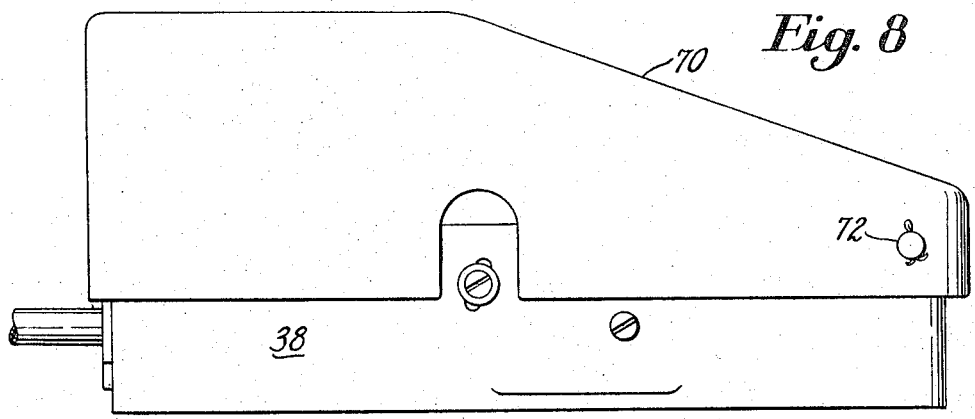
FIG. 8 is a view in left side elevation of the treadle for controlling the driving and stopping mechanism.

While the machine is capable of being started and stopped entirely by an operator, it may be stopped automatically at the end of the seam, if desired. For stopping automatically a modification of the control circuits in accordance with those of the Clemens patent is necessary. When the machine is intended to be stopped by the operator at the end of a seam, an operation selector switch 68 (FIG. 1) in the functional control box 32 is shifted to position "1." In this position of the switch starting and stopping of the machine is accomplished by actuation of a treadle 70 on the receptacle 38, the receptacle having contained therein a pair of switches FS1 and FS2 (see FIGS. 6 and 7). The treadle 70 is in the form of a hollow cover for the receptacle, which treadle is pivoted about its forward end by a pin 72 passing through telescoping sides of the treadle and receptacle. To maintain the treadle normally in raised position there is compressed between the treadle and receptacle a coil spring 74.

Both the switches FS1 and FS2 are of the single pole, double throw type having independent operating springs 76 and 78 for maintaining the movable contacts in engagement with the uppermost ones of the stationary contacts provided therein. However, when the treadle 70 is partially depressed, the machine is started at an initial low speed. Upon being completely depressed, the speed of the machine is increased to a maximum. This is the result of actuating the switch FS1 first and the switch FS2 thereafter during depression of the treadle 70.

Sequential depression of the switches FS1 and FS2 is accomplished by providing a roll 80 rotatably mounted inside the treadle 70 at a position to engage an upwardly and rearwardly extending arm 82 of the switch FS1. The roll 80 engages the arm 82 during the first part of the downward depressing movement of the treadle and it is not until just before the final limit of downward depressing movement of the treadle that a spring pressed plunger 84 on the switch FS2 is engaged by the underside of the treadle. Thus, FS1 may be considered a low-speed switch and FS2 a high-speed switch, there being limited lost motion, as indicated diagrammatically by the numeral 86, between the operation of the two switches by the foot treadle.

Referring more particularly to FIG. 9, the motor driving, dynamic braking and final stopping actions are afforded by control circuits energized from a source of alternating current 88 connectible by main line switches S1, S2 to a variac or adjustable auto-transformer 90, there also being a pilot light PL disposed in the circuit controlled by the main switch. The output of the transformer 90 is connected directly to a full-wave rectifier B4 for energizing a field coil 92 of the motor 36, the field coil surrounding the armature 54.

By reference to FIG. 10 a clearer understanding of the control circuits for the motor, the dynamic braking circuit and the magnetic stopping device will readily be apparent. In this figure the sequence of steps (1) to (10) include the fundamental operations of the control circuits. Thus, under step (1) the closing of the main switches S1, S2 applies power to the transformer 90 and the field rectifier B4. Also, a time delay relay K2 is energized, the time period for which delays the closing of the lowermost contact in a pair of single-pole, double-throw switches. After the relay K2 has pulled down its armature to close the lower contacts of its switches, the machine is brought into condition for sewing operation.

Under step (2) the operator depresses the treadle 70 partway, operating the switch FS1 downwardly from the position of FIG. 9 without changing the position of the switch FS2. Under these conditions relay K5 is actuated, energizing the rectifier B3 from a terminal (a) of the transformer, through the uppermost contact of switch FS2, the lowermost contact of the relay K5, and the rectifier B3. The terminal (a) provides a low voltage supply, so that a corresponding low-voltage direct current is connected through the uppermost contacts of relay K4 to the motor armature, starting the motor at low speed. During this time, relays K3 and K4 remain disconnected from the power line.

Under step (3) the treadle may be fully depressed, causing the switch FS2 to be moved to close its lowermost contact, disconnecting the terminal (a) of the transformer from the rectifier B3 and reconnecting it with a higher-voltage terminal (b).

Under these conditions the full voltage is applied to the motor armature 54 and the motor shaft is turned at maximum speed. Having reached maximum speed, the operator eventually senses the approaching end of a seam and partly releases the treadle, step (4), enabling the switch FS2 to complete a circuit through its uppermost contact, while the switch FS1 maintains the circuit through its lowermost contact. Low voltage from the transformer terminal (a) is then applied to the rectifier B3, causing the motor armature 54 to slow down to its low speed of rotation.

Under step (5) the treadle is fully released to initiate bringing the main sewing shaft 40 to rest, enabling the switch FS1 to close the circuit through its uppermost contact, the switch FS2 having already closed the circuit through its uppermost contact. The coil of relay K2 is then energized, determining a fixed time-delay period for retardation by the dynamic braking circuit before which the movable contacts of a pair of connected single pole, double-throw switches are shifted downwardly from the position shown in FIG. 9. At the same time the upward movement of the switch FS1 disconnects the line circuit from the relay K5, enabling the circuit through the uppermost contact of the switch to be closed. Also, closing the uppermost contact of treadle switch FS1 causes the relay K4 to be energized through the uppermost contact of the lower switch in relay K2, disconnecting the armature 54 of the motor from the rectifier B3 and reconnecting it with the dynamic braking resistor B5. By so doing, the speed of the motor is abruptly retarded. Closing the uppermost contact of treadle switch FS1, also closes the circuit to the uppermost contact of the upper switch in the relay K2 to a resistor R6 and a rectifier B1 connected in turn to the coil of a relay K3 for controlling the magnetic stopping device, energizing that relay.

As soon as the coil of relay K3 is energized, as in step (6), power is applied through an upper switch actuated thereby, through a resistor R4 to the rectifier B3, causing the voltage applied to that rectifier to be reduced by the resistor R4. The motor armature, however, being still connected to the dynamic braking resistor R5 continues to be slowed down further and may, before further changes in the control circuit take place, come to a complete stop.

Regardless of whether the motor 36 is completely stopped at this time or not, the time delay period of the relay K2 eventually expires, as in step (7), and the lower switch of that relay opens its uppermost contact and closes a circuit to a rectifier B1 and through its lower contact energizes the solenoid NU for bringing the machine to rest in a needle-up position or energizes the solenoid ND for bringing the machine to rest in a needle-down position. The switches of relay K3 are then held in their lowermost positions by an electrical charge stored in condenser C1 connected across the coil of the relay K3.

The magnetic force applied to the block 62 is sufficient to stop rotation of the motor shaft in the desired position when rotating under 200 r.p.m., and the stopped position of the motor is determined by one of these solenoids. In case the motor should stop under the retardation of dynamic braking in a position where the magnetic block 62 is out of the range of a gap in one of the solenoids, the action of the switches in relay K2 deenergizes the relay K4, as in step (8), so that the circuit of the armature 54 is again connected to the rectifier B3, while the voltage on that rectifier is reduced by the resistor R4. The motor, therefore, is restarted at a much reduced speed and with much lower torque to turn the armature until the block 62 is brought into the gap of the proper stopping solenoid, the motor then being brought positively to rest. Shortly thereafter the motor is restarted and again stopped as in step (9) by one of the stopping solenoids, the condenser C1 connected to the relay K3 becomes discharged and both switches of this relay are permitted to close their upper contacts as indicated in the sequence chart (step 10). When the lower contact in the switch of relay K5 (step 5) opens its circuit the alternating current supply is cut off from the rectifier B3, removing resistance to rotation from the motor shaft, so that the sewing shaft 40 may be turned over by hand without hindrance.

The only requirement to be met for the delay period of the relay K2 is that it should prolong the time of retardation from maximum speed to insure a reduction in speed of the sewing shaft to less than 200 r.p.m. If the sewing shaft is rotating at a speed less than its maximum when the treadle is released the shaft probably will stop and be restarted. It is obvious that the length of the delay periods for the relays K2 and K3 may be shortened or lengthened proportionately to each other to be operated in sequence in accordance with the stopping requirements of the machine. The length of time needed to start and stop the motor a second time, after being brought to rest by the dynamic braking circuit determines the size of the condenser C1. It is possible, however, that the delay period may be reduced to a point where the shaft will be brought to rest in a single rotation while operating at maximum speed. Under these conditions an extremely short time after the treadle 70 has fully been released delay periods for both relays are sufficient for bringing the machine to rest.

An outstanding advantage of the present invention is that no timing contacts are needed on the sewing shaft 40 or the motor shaft 52 and the only essential requirement for the sewing machine is to have a commercially available ribbed pulley substituted for a round or V-pulley usually employed on a standard sewing machine of this type. Thus, the adaptation of the machine for use with the driving and stopping mechanisms embodying the features of the present invention requires no special machine work or adjustments necessitating careful timing of commutators during attachment to the sewing shaft.

The nature of the invention having been indicated and a specific embodiment having been described, what is claimed is:

1. Driving and stopping mechanisms for a machine having a tool for operating toward and from a work piece to perform an operation on the work piece, a tool actuating shaft, an electric motor operatively connected to said shaft, a dynamic braking circuit for the motor to retard rotation of the tool actuating shaft, and a magnetic device acting on said shaft to bring it to rest at a predetermined position, in combination with control circuits for connecting the dynamic braking circuit and for energizing the magnetic device in sequence to avoid stopping the shaft under the action of the magnetic device except after a fixed period of retardation of said shaft by the dynamic braking circuit.

2. Driving and stopping mechanisms as in claim 1, in which there is provided a time delay relay in the control circuits for determining the period of retardation by the dynamic braking circuit.

3. Driving and stopping mechanisms, as in claim 2, in which there is provided a second time delay relay for de-energizing the magnetic device after the tool actuating shaft has been brought to rest.

4. Driving and stopping mechanisms for a machine having a tool for operating toward and from a work piece to perform an operation on the work piece, a tool actuating shaft, an electric motor operatively connected to said shaft, a dynamic braking circuit for the motor to retard rotation of the tool actuating shaft, and a magnetic device acting on said shaft to bring it to rest at a predetermined position, in combination with control circuits for connecting the dynamic braking circuit and for energizing the magnetic device in sequence to avoid stopping the shaft under the action of the magnetic device except after a fixed period of retardation of said shaft by the dynamic braking circuit and a reduced voltage source of power arranged for connection with the motor for insuring rotation of the tool actuating shaft to its position of rest after the speed of rotation of the shaft has been reduced by the dynamic braking circuit.

5. Driving and stopping mechanism, as in claim 4, in which there is provided a time delay relay for de-energizing the magnetic stopping device and disconnecting the reduced voltage source of power from the motor to enable the tool operating shaft to be turned over by hand without hindrance.

6. Driving and stopping mechanisms for a sewing machine having stitch forming devices including a needle operating toward and from engagement with a work piece, a main sewing shaft for actuating the stitch forming devices, an electric motor operatively connected to said shaft, a dynamic braking circuit for the motor to retard rotation of the sewing shaft, a magnetic block rotating with the sewing shaft, and a magnetic core having a gap through which the block passes to bring the sewing shaft to rest while the needle is disengaged from the work, in combination with control circuits for connecting the dynamic braking circuit and for energizing the magnetic core in sequence to avoid stopping the shaft from attraction of the magnetic block in the gap of the magnetic core except after a fixed period of retardation of said shaft by the dynamic braking circuit.

7. Driving and stopping mechanisms for a sewing machine having stitch forming devices including a needle operating toward and from engagement with a work piece, a main sewing shaft for actuating the stitch forming devices, an electric motor operatively connected to said shaft, a dynamic braking circuit for the motor to retard rotation of the sewing shaft, a magnetic block rotating with the sewing shaft, and a magnetic core having a gap through which the block passes to bring the sewing shaft to rest while the needle is disengaged from the work, in combination with control circuits for connecting the dynamic braking circuit and for energizing the magnetic core in sequence to avoid stopping the shaft from attraction of the magnetic block in the gap of the magnetic core except after a fixed period of retardation of said shaft by the dynamic braking circuit, a second magnetic core having a gap through which the magnetic block passes arranged at a position where it will be entered by the block to bring the sewing shaft to rest at a time when the needle engages the work piece, and a selector switch to energize one or the other of the magnetic cores to enable the sewing shaft to be stopped in either position.

References Cited
UNITED STATES PATENTS

| 2,604,864 | 7/1952 | Merchant | 112—219 |
| 2,876,407 | 3/1959 | Winz | 112—219 X |
| 3,149,593 | 9/1964 | Johnston | 112—219 |
| 3,163,811 | 12/1964 | Vaucher | 112—219 X |
| 3,226,621 | 12/1965 | Heinemann et al. | 112—219 X |
| 3,170,424 | 2/1965 | Fuge | 112—219 |
| 3,186,366 | 6/1965 | Haas et al. | 112—219 |

FOREIGN PATENTS

| 527,908 | 6/1931 | Germany. |
| 910,023 | 4/1954 | Germany. |

JORDAN FRANKLIN, *Primary Examiner.*

H. H. HUNTER, *Assistant Examiner.*